United States Patent
Raspati et al.

(10) Patent No.: US 12,253,028 B2
(45) Date of Patent: Mar. 18, 2025

(54) APPARATUS COMPRISING A DEVICE FOR REGULATING A CONCENTRATION OF DIHYDROGEN

(71) Applicants: Airbus SAS, Blagnac (FR); Airbus Operations SAS, Toulouse (FR)

(72) Inventors: Olivier Raspati, Blagnac (FR); Jonathan Landolt, Toulouse (FR)

(73) Assignees: Airbus SAS, Blagnac (FR); Airbus Operations SAS, Toulouse (FR)

( * ) Notice: Subject to any disclaimer, the term of this patent is extended or adjusted under 35 U.S.C. 154(b) by 0 days.

(21) Appl. No.: 18/487,229

(22) Filed: Oct. 16, 2023

(65) Prior Publication Data
US 2024/0125274 A1 Apr. 18, 2024

(30) Foreign Application Priority Data
Oct. 18, 2022 (FR) ........................................ 2210763

(51) Int. Cl.
*B64D 37/32* (2006.01)
*B64D 37/28* (2006.01)
*B64D 37/30* (2006.01)
*F02C 7/22* (2006.01)
(Continued)

(52) U.S. Cl.
CPC ............ *F02C 7/22* (2013.01); *B64D 37/28* (2013.01); *B64D 37/30* (2013.01); *B64D 37/32* (2013.01); *F02C 9/40* (2013.01); *B64D 27/12* (2013.01)

(58) Field of Classification Search
CPC ........ B64D 37/28; B64D 37/30; B64D 37/32; B64D 27/12; F02C 9/40
See application file for complete search history.

(56) References Cited

U.S. PATENT DOCUMENTS 3,203,651 A * 8/1965 Garrett .................. B64D 37/32
244/58
4,908,978 A * 3/1990 Zacharias ............. A01M 1/223
43/111
(Continued)

FOREIGN PATENT DOCUMENTS

EP 3995679 A1 5/2022
GB 2603944 A 8/2022

OTHER PUBLICATIONS

French Search Report for corresponding French Patent Application No. 2210763 dated Jun. 15, 2023; priority document.

*Primary Examiner* — Lorne E Meade
(74) *Attorney, Agent, or Firm* — Greer, Burns & Crain, Ltd.

(57) ABSTRACT

An apparatus contains a dihydrogen tank and/or a dihydrogen circuit, and a device for regulating a concentration of dihydrogen located outside the tank and/or the circuit. The device includes at least one pair of electrical conductors including a first electrical conductor supplied with a first voltage and a second electrical conductor supplied with a second voltage which is different from the first voltage. At least one controller repeatedly commands the application of a predetermined voltage difference between the first electrical conductor and the second electrical conductor so that an electric arc of controlled power is formed in order to burn dihydrogen possibly coming from the tank and/or from the circuit. Thus, dihydrogen does not accumulate in undesired places in the apparatus.

16 Claims, 3 Drawing Sheets

(51) Int. Cl.
*F02C 9/40* (2006.01)
*B64D 27/12* (2006.01)

(56) References Cited

U.S. PATENT DOCUMENTS

| | | | | |
|---|---|---|---|---|
| 5,803,726 | A * | 9/1998 | Bacon | F23G 7/085 |
| | | | | 431/264 |
| 6,161,506 | A * | 12/2000 | Hanson | F24H 1/285 |
| | | | | 122/135.1 |
| 8,821,797 | B2 | 9/2014 | Tsukabayashi et al. | |
| 10,675,633 | B2 * | 6/2020 | Nelson | F23G 5/085 |
| 10,998,165 | B2 * | 5/2021 | Nelson | F23G 5/085 |
| 2003/0044741 | A1 * | 3/2003 | McGehee | F23Q 3/008 |
| | | | | 431/263 |
| 2020/0148380 | A1 | 5/2020 | Kwon et al. | |
| 2022/0307428 | A1 | 9/2022 | Sibbach et al. | |

\* cited by examiner

APPARATUS COMPRISING A DEVICE FOR REGULATING A CONCENTRATION OF DIHYDROGEN

CROSS-REFERENCES TO RELATED APPLICATIONS

This application claims the benefit of the French patent application No. 2210763 filed on Oct. 18, 2022, the entire disclosures of which are incorporated herein by way of reference.

FIELD OF THE INVENTION

The invention relates to the field of apparatuses containing a dihydrogen tank and/or a dihydrogen circuit. These apparatuses correspond, for example, to vehicles, in particular aircraft, motor vehicles, railway vehicles or watercraft, or indeed apparatuses attached to the ground.

BACKGROUND OF THE INVENTION

As is known, dihydrogen may constitute an alternative to petroleum in the propulsion of vehicles, in particular of aircraft. Specifically, particularly advantageously, the reaction of oxidization of dihydrogen produces water, this making dihydrogen a cleaner energy producer than petroleum. Dihydrogen may notably be used to power a fuel cell stack supplying power to one or more electric motors for propelling the vehicle, such as an aircraft, or indeed as fuel, such as for an aircraft turboprop.

In a vehicle comprising a dihydrogen tank or a dihydrogen distribution circuit, it is desirable to prevent dihydrogen from being able to accumulate in undesired places, in particular in closed or semi-closed spaces, for example under a fairing of an aircraft.

Thus, it is desirable to provide a solution which makes it possible to control the concentration of dihydrogen in an apparatus comprising a dihydrogen tank and/or a dihydrogen circuit.

There are sensors which make it possible to measure a concentration of dihydrogen. However, these sensors make it possible to measure the concentration of dihydrogen only very locally, at their location, and in addition they use a chemical membrane which has a relatively long reaction time. Moreover, given that these are sensors, they make it possible to locally measure the concentration of dihydrogen, but they do not make it possible to control the concentration of dihydrogen by making it decrease.

SUMMARY OF THE INVENTION

To this end, according to a first aspect, an apparatus containing a dihydrogen tank and/or a dihydrogen circuit is proposed. The apparatus comprises a device for regulating a concentration of dihydrogen which comprises at least one pair of electrical conductors, as well as at least one controller, and which is located outside the tank and/or the circuit, each pair of electrical conductors comprising a first electrical conductor and a second electrical conductor, the first electrical conductor and the second electrical conductor of each pair being spaced apart by a predetermined distance, and the at least one controller being configured to repeatedly command the application of a predetermined voltage difference between the first electrical conductor and the second electrical conductor so that, based on the predetermined distance, an electric arc of controlled power is formed between the first electrical conductor and the second electrical conductor.

Thus, given that the device for regulating a concentration of dihydrogen repeatedly produces electric arcs between the first and second electrical conductors, if dihydrogen is present in the surrounding air, these electric arcs make it possible to burn dihydrogen and therefore to reduce the concentration thereof. This notably prevents dihydrogen from being able to accumulate in undesired places in the apparatus. This makes it possible to reduce or to delay the increase in the concentration of dihydrogen in the air. The fact that the electric arcs are produced with a controlled power of low value makes integration possible without any impact on the surrounding elements, such as mechanical parts or other systems.

In one particular arrangement, the device comprises several spaced-apart insulating spacers interposed between the first electrical conductor and the second electrical conductor of each pair, the insulating spacers being in the form of balls or of ovoids.

In one particular arrangement, the device comprises a first series composed of the first electrical conductors orientated in a first direction and comprises a second series composed of the second electrical conductors orientated in a second direction which intersects the first direction, so that the first series and the second series form cells.

In one particular arrangement, the device comprises a first series of first electrical conductors orientated in a first direction and comprises a second series of second electrical conductors orientated in a second direction which is parallel to the first direction.

In one particular arrangement, the device is configured so that the at least one controller commands the application of the predetermined voltage difference between the first electrical conductors and the second electrical conductors simultaneously for the various pairs of electrical conductors.

In one particular arrangement, the device is configured so that, for each pair of electrical conductors being supplied with electricity independently of the other pairs of electrical conductors, the at least one controller commands the application of the predetermined voltage difference between the first electrical conductors and the second electrical conductors with a time lag for at least two pairs of electrical conductors.

In one particular arrangement, the at least one controller is configured to command the application of the predetermined voltage difference between the first electrical conductors and the second electrical conductors so that at most a single pair of electrical conductors is supplied with power at each instant.

In one particular arrangement, the at least one controller is connected to at least one optical sensor and the at least one controller is configured to receive a signal originating from the at least one optical sensor, to analyze this signal so as to detect the possible presence of a spectral line corresponding to the combustion of dihydrogen and to transmit a warning signal to a signaling system of the apparatus in the event that such a spectral line is detected.

In one particular arrangement, the at least one optical sensor is connected to at least one optical fiber.

In one particular arrangement, the at least one optical fiber is parallel to the first electrical conductor or to the second electrical conductor.

In one particular arrangement, the at least one controller is connected to at least one thermal sensor and the at least one controller is configured to receive a signal originating from the at least one thermal sensor, to analyze this signal so as to detect a possible temperature rise due to the combustion of dihydrogen and to transmit a warning signal to a signaling system of the apparatus in the event that such a temperature rise is detected.

In one particular arrangement, the at least one optical fiber is used both for the at least one optical sensor and for the at least one thermal sensor.

In one particular arrangement, the apparatus further comprises an additional device for regulating dihydrogen using a material which catalyzes an oxidization reaction of dihydrogen with the surrounding air.

In one particular arrangement, the catalytic material is applied to an electrical conductor and/or an optical fiber and/or a spacer of the device.

In one particular arrangement, the at least one controller is configured to operate in two operating modes:
- a first mode, referred to as monitoring mode, in which the at least one controller monitors for the presence of dihydrogen in the device as long as the presence of dihydrogen is not detected, and in which the at least one controller commands the application of the predetermined voltage difference between the first electrical conductor and the second electrical conductor of a pair of conductors with a first time interval between two successive applications of the predetermined voltage difference; and
- a second operating mode, when the presence of dihydrogen in the device is detected, such that, when the at least one controller detects a concentration of dihydrogen at least in one region of the device, the region corresponding to this pair of conductors, the controller commands the application of the predetermined voltage difference between the first electrical conductor and the second electrical conductor of the pair of electrical conductors with a second time interval between two successive applications of the predetermined voltage difference, the second time interval being shorter than the first time interval.

In one particular arrangement, the device is in the form:
- of a coating applied to a surface of a volume of the apparatus in which dihydrogen is liable to accumulate; or
- of a sleeve arranged around a region for connecting dihydrogen storage or distribution elements.

BRIEF DESCRIPTION OF THE DRAWINGS

The above-mentioned features of the invention, as well as others, will become more clearly apparent on reading the following description of at least one exemplary embodiment, the description being given with reference to the appended drawings, in which.

DETAILED DESCRIPTION OF THE PREFERRED EMBODIMENTS

Apparatus

Figure 1:
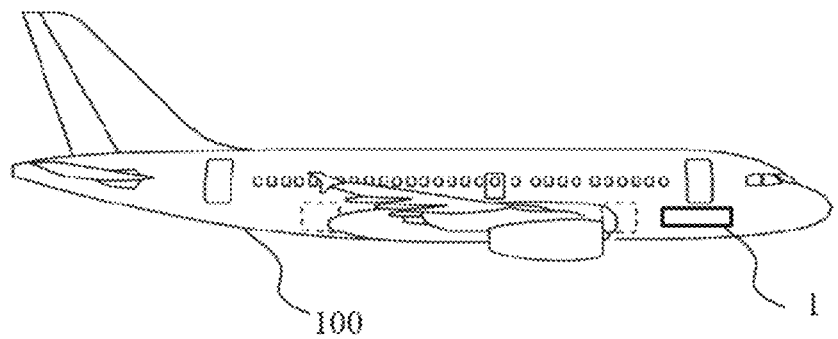
FIG. 1 schematically illustrates an aircraft comprising a device for regulating a concentration of dihydrogen.

With reference to FIG. 1, an apparatus corresponding to an aircraft 100 containing a dihydrogen tank and/or a dihydrogen circuit and comprising a device 1 for regulating a concentration of dihydrogen is proposed.

It should be noted that the device 1 for regulating a concentration of dihydrogen is not specific to an aircraft and may also apply to any other type of apparatus comprising a dihydrogen tank or a dihydrogen distribution circuit without departing from the scope of the invention.

The device 1 is located in the aircraft 100 outside the dihydrogen tank and the dihydrogen circuit, in places where it is desired for dihydrogen not to be able to accumulate beyond a certain concentration.

For example, the aircraft 100 contains a dihydrogen tank and a dihydrogen circuit for powering one or more fuel cells supplying power to one or more electric motors propelling the aircraft 100. According to another example, the aircraft 100 contains a dihydrogen tank and a dihydrogen circuit for supplying dihydrogen to a turboprop operating by combustion of dihydrogen.

Device for Regulating a Concentration of Dihydrogen

Figure 2:
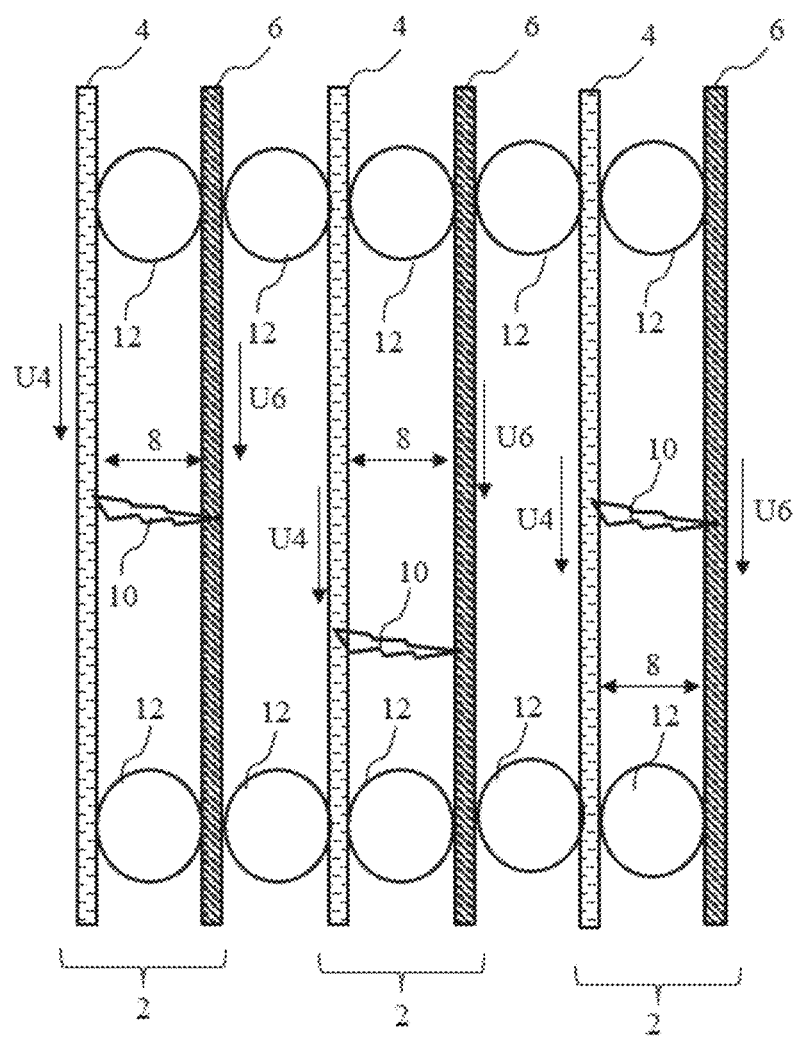
FIG. 2 schematically illustrates one arrangement of pairs of electrical conductors of the device for regulating a concentration of dihydrogen.
Figure 3:
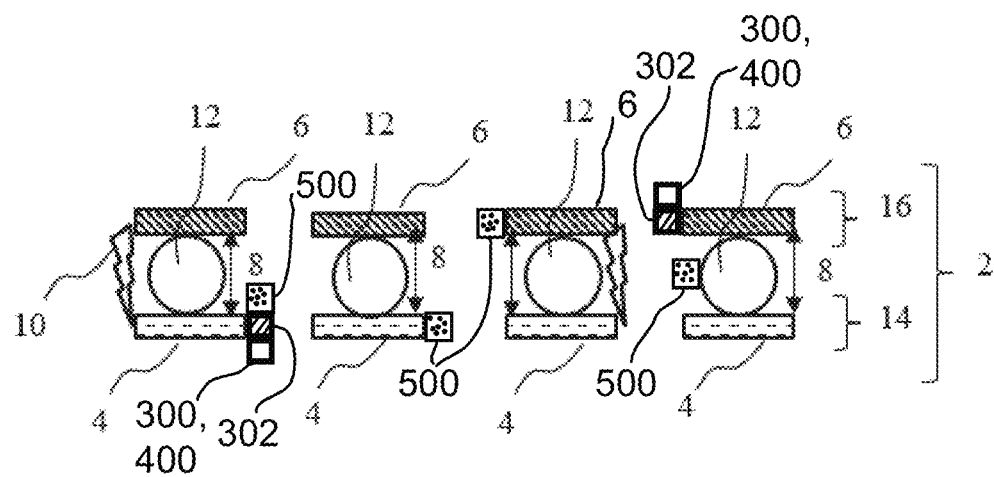
FIG. 3 schematically illustrates another arrangement of pairs of electrical conductors of the device for regulating a concentration of dihydrogen.
Figure 4:
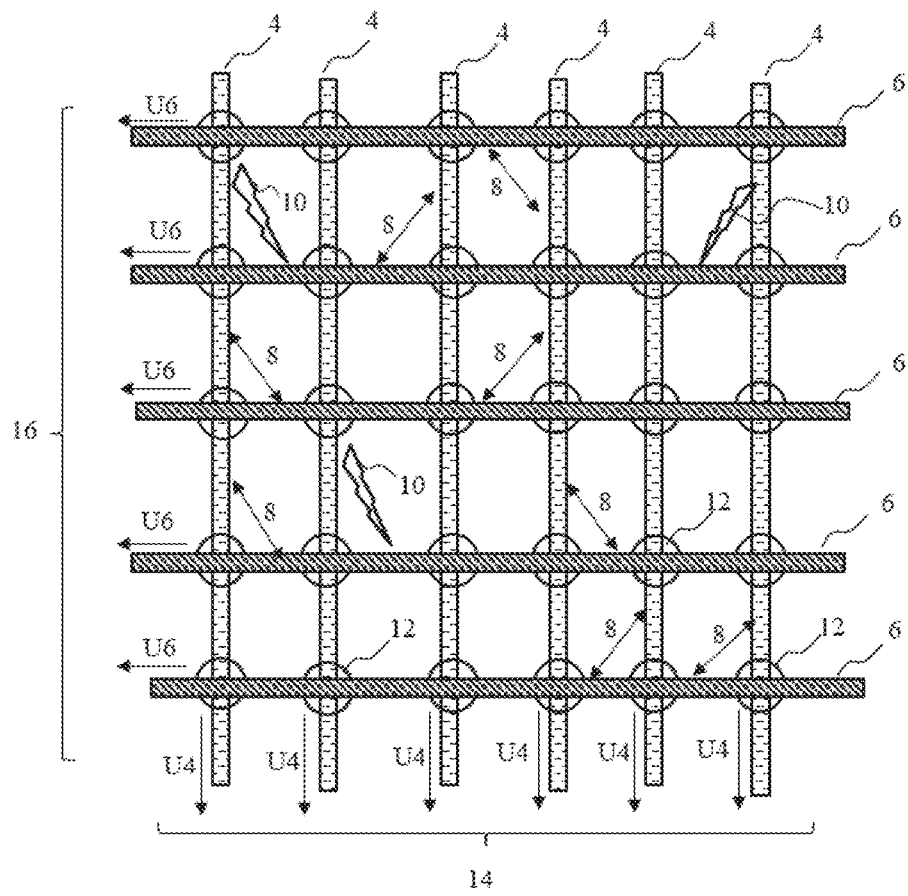
FIG. 4 schematically illustrates yet another arrangement of pairs of electrical conductors of the device for regulating a concentration of dihydrogen.

With reference to FIGS. 2, 3 and 4, the device 1 notably comprises at least one pair 2 of electrical conductors comprising a first electrical conductor 4 and a second electrical conductor 6. The electrical conductors 4 and 6 may be metal wires (such as copper wires) or metal strips.

The device 1 further comprises a controller 200. The device 1 may comprise several controllers acting coordinately in order to implement the behaviors described here in relation to the controller 200.

The controller 200 is configured so that, in operation, it repeatedly commands the application of a predetermined voltage difference between the first electrical conductor 4 and the second electrical conductor 6. When the predetermined voltage difference is applied, the first electrical conductor 4 is supplied with a first voltage U4 and the second electrical conductor 6 is supplied with a second voltage U6, the voltages U4 and U6 being such that the difference between U4 and U6 corresponds to the predetermined voltage difference.

In particular, one of the voltages U4 and U6, for example U6, may correspond to a reference voltage of 0 volts. The value of the other voltage, for example U4, then corresponds to the predetermined voltage difference.

The first electrical conductor 4 and the second electrical conductor 6 of each pair 2 of electrical conductors are spaced apart by a predefined distance 8.

The values of the predefined distance 8 and of the predetermined voltage difference are chosen so that an electric arc 10 is formed between the two electrical conductors 4 and 6 when the predetermined voltage difference is applied between the first electrical conductor 4 and the second electrical conductor 6.

It will be recalled that an electric arc 10 is created by ionization of an insulating medium (here air) when two conductive surfaces (here the pair 2 of electrical conductors 4 and 6) between which there is a voltage difference are sufficiently close (here the electrical conductors are spaced apart by a predefined distance 8).

The controller 200 commands the application of the predetermined voltage difference between the first electrical conductor 4 and the second electrical conductor 6 so that the electric arc 10 is produced with a controlled power, in view of the spacing between the two electrical conductors 4 and 6, which is defined by the predefined distance 8.

For this purpose, the controller 200 commands, for example, a maximum value of the electric current which is able to flow through the first electrical conductor 4 and the second electrical conductor 6. The power of the electric arc 10, which is controlled by the controller 200, is chosen so that the electrical energy dissipated in the electric arc 10 is greater, by a predetermined margin, than the activation energy of dihydrogen (about 17 millijoules). This guarantees that the electric arc 10 makes it possible to burn dihydrogen which is present between the first electrical conductor 4 and the second electrical conductor 6. Furthermore, the power of the electric arc 10, which is controlled by the controller 200, is chosen so that the electrical energy dissipated in the electric arc 10 is less than a predetermined maximum value, which is, for example, chosen in an interval of between 2 times and 10 times the value of the activation energy of dihydrogen, preferably of between 2 times and 5 times the value of the activation energy of dihydrogen.

In the device 1, when the air contains dihydrogen coming notably from a leak from the dihydrogen tank or from a dihydrogen distribution duct, the electric arc 10 makes it possible to burn dihydrogen which is present between the first electrical conductor 4 and the second electrical conductor 6, in order to reduce the concentration of dihydrogen and form water. This notably prevents dihydrogen from being able to accumulate in undesired places in the apparatus. This makes it possible to reduce or to delay the increase in the concentration of dihydrogen in the air. The fact that the electric arcs are produced with a controlled power of low value makes integration possible without any impact on the surrounding elements, such as mechanical parts or other systems.

Preferably, the controller 200 commands the application of the predetermined voltage difference between the first electrical conductor 4 and the second electrical conductor 6 with a time interval, between two successive applications of the predetermined voltage difference, of between 1 millisecond and 10 seconds, preferably of between 1 millisecond and 2 seconds. The rest of the time, no voltage difference is applied between the first electrical conductor 4 and the second electrical conductor 6.

Arrangement of the Electrical Conductors in Parallel

According to an embodiment illustrated in FIG. 2, the first electrical conductor 4 and the second electrical conductor 6 are arranged side by side in parallel directions.

According to this embodiment, the electrical conductors 4 and 6 are arranged so as to have a single layer (a single plane) of electrical conductors 4 and 6, in which a first electrical conductor 4 and a second electrical conductor 6 alternate, spaced apart. The distance 8 between the first electrical conductors 4 and the second electrical conductors 6 may be guaranteed by insulating spacers 12 which are spaced apart from one another. Typically, these insulating spacers 12 may be in the form of balls, or of ovoids, made of insulating material, which are positioned between the first electrical conductors 4 and the second electrical conductors 6.

FIG. 3 presents a variant in which the electrical conductors 4 and 6 are also arranged in parallel directions. According to this variant, the electrical conductors 4 and 6 are arranged in two superposed layers (i.e., in two parallel planes). More specifically, a first series 14 composed of the first electrical conductors 4 forms a first layer. The first electrical conductors 4 of the first series 14 are arranged next to one another and are orientated in the same direction.

A second series 16 composed of the second electrical conductors 6 forms a second layer superposed on the first layer. The second electrical conductors 6 of the second series 16 are arranged next to one another and are orientated in the same direction as the first electrical conductors 4 of the first series 14.

The distance 8 between the first electrical conductors 4 and the second electrical conductors 6 may be guaranteed by insulating spacers. Typically, these insulating spacers 12 may be in the form of balls, or of ovoids, made of insulating material, which are positioned between the first electrical conductors 4 and the second electrical conductors 6.

Thus, in other words, according to this embodiment the device 1 comprises two superposed layers.

Arrangement of the Electrical Conductors in Cells

According to an embodiment shown in FIG. 4, the device 1 comprises a first series 14 composed of the first electrical conductors 4 in a first plane and orientated in a first direction and comprises a second series 16 composed of the second electrical conductors 6 in a second plane, which is parallel to the first plane, and orientated in a second direction, which is different from the first direction, so that the first series 14 and the second series 16 form cells (in a view which is perpendicular to the first and second planes). Thus, in other words, according to this embodiment, the electrical conductors of the first series 14 and of the second series 16 are orientated in two intersecting directions. Each series 14 and 16 forms a respective layer. The device 1 comprises two stacked layers forming cells.

In one particular arrangement, the second direction is orthogonal to the first direction.

Furthermore, particularly advantageously, the distance 8 between the first electrical conductors 4 and the second electrical conductors 6 (that is to say, between the first and second planes) may be guaranteed by insulating spacers 12. Typically, these insulating spacers 12 may be in the form of balls, or of ovoids, made of insulating material, which are positioned between the first electrical conductors 4 and the second electrical conductors 6. According to this embodiment, the insulating spacers 12 may be positioned between the first electrical conductors 4 and the second electrical conductors 6.

Controlling the Electric Power Supply of the Electrical Conductors

According to one embodiment, all of the pairs 2 of electrical conductors are supplied with electricity simultaneously, with the first voltage U4 for the first electrical conductors 4 and the second voltage U6 for the second electrical conductors 6, respectively. Thus, according to this embodiment, the first electrical conductors 4 and the second electrical conductors 6 are all supplied with electricity simultaneously. In other words, according to this embodiment, the first voltage U4 is applied at the same time to all the first electrical conductors 4 of the device 1 and the second voltage U6 is applied at the same time to all the second electrical conductors 6 of the device 1.

According to another embodiment, each pair 2 of electrical conductors 4 and 6 is supplied with electricity independently of the other pairs 2 of electrical conductors, at least two pairs 2 of electrical conductors being supplied with electric power with a time lag. Thus, according to this embodiment, it is possible to supply power to the pairs 2 of electrical conductors 4 and 6 separately. In other words, this embodiment makes it possible not to supply power to all the pairs 2 of electrical conductors 4 and 6 at the same time, and thus reduce the power consumption of the device 1.

According to another embodiment, each pair 2 of electrical conductors 4 and 6 is supplied with electric power with a time lag with respect to the electric power supply of the other pairs 2 of electrical conductors, so that at most a single pair 2 of electrical conductors 4 and 6 is supplied with electric power at each instant. In other words, according to this embodiment the pairs 2 of electrical conductors 4 and 6 are turned on, one by one.

Controller

The controller 200 comprises electronic circuitry for controlling the electric power supply of the pairs 2 of electrical conductors 4 and 6.

Figure 5:
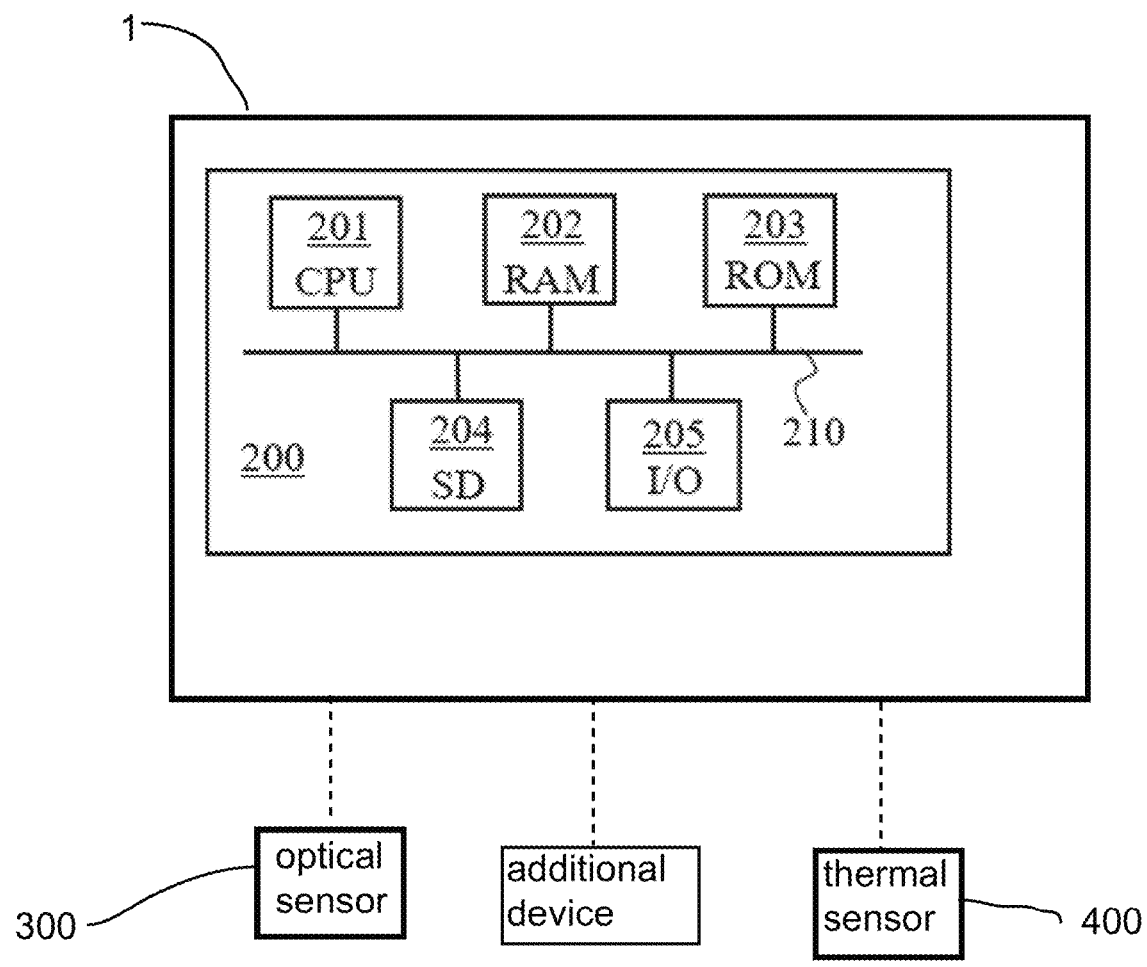
FIG. 5 schematically illustrates a hardware arrangement of the device for regulating a concentration of dihydrogen including a controller and one or more sensors.

As shown schematically in FIG. 5, the controller 200 may comprise the following, connected by a communication bus 210: a processor 201; a random-access memory 202; a read-only memory 203, for example an EEPROM (electrically erasable programmable read-only memory), and an input-output interface manager 205. Advantageously, the input-output interface manager 205 makes it possible to control one or more electric power supplies making it possible to deliver the first voltage U4 and the second voltage U6 in a controlled manner.

The processor 201 is capable of executing instructions loaded into the random-access memory 202 from the read-only memory 203, from an external memory, from a storage medium (such as an SD card) or from a communication network. When the computer system 200 is turned on, the processor 201 is capable of reading instructions from the random-access memory 202 and of executing them. These instructions form a computer program causing the electric power supply of the electrical conductors 4 and 6 to be controlled by the processor 201.

The electric power supply of the electrical conductors 4 and 6 may thus be wholly or partly controlled in software form by executing a set of instructions by means of a programmable machine, for example a DSP (digital signal processor) or a microcontroller, or in hardware form by a machine or a dedicated component, for example an FPGA (field-programmable gate array) or ASIC (application-specific integrated circuit). Generally, the controller 200 comprises electronic circuitry adapted and configured to control, in software and/or hardware form, the electric power supply of the electrical conductors 4 and 6.

Arc Detection

Particularly advantageously, the device 1 may incorporate means for detecting an electric arc 10. Typically, these means may be connected to the controller 200 in order to pass on information on the detection of an electric arc 10. In addition, in one particular arrangement, this information may also be transmitted to information-processing means of the aircraft 100, such as the avionics of the aircraft 100, in order to indicate the presence of a concentration of dihydrogen which is above or equal to a predetermined threshold, in a place in the aircraft 100 where the device 1 is positioned.

It is specified that the electric arc detection means may further make it possible to monitor whether the device 1 is operating correctly by checking that electric arcs 10 are being generated correctly.

In one particular arrangement, the controller 200 comprises electronic circuitry for measuring electric currents flowing through the first electrical conductor 4 and through the second electrical conductor 6, in order to detect an electric arc 10 connecting the first electrical conductor and the second electrical conductor of a given pair 2. The measurements carried out are analyzed by the controller 200 in order to determine the presence of an electric arc. Thus, when the controller 200 does not determine the presence of an electric arc when the controller 200 has commanded the application of the predetermined voltage difference between the first electrical conductor 4 and the second electrical conductor 6, the controller 200 thus determines a fault of the device 1 and the controller 200 signals this fault to a signaling system of the apparatus, for example to a signaling system in the cockpit of the aircraft.

In another particular arrangement, the controller 200 is connected to an optical sensor 300, in order to optically detect an electric arc between the first electrical conductor 4 and the second electrical conductor 6. In one particular embodiment (see, FIG. 3), the optical sensor 300 is connected to an optical fiber 302 running along one of the electrical conductors 4, 6 of the pair 2 of electrical conductors. The optical fiber 302 may pick up a light signal emitted by the electric arc 10 and transmit this light signal to the optical sensor 300 connected to the controller 200. The controller 200 is configured to analyze a signal transmitted by the optical sensor 300 so as to detect the possible presence of a spectral line (of the light signal) corresponding to the combustion of dihydrogen. Specifically, while burning, dihydrogen emits light radiation having a specific wavelength (656.3 nm). If the signal transmitted by the optical sensor 300 corresponds to this wavelength, the controller 200 thus detects the presence of dihydrogen in the device 1. The amplitude of the spectral line depends on the concentration of dihydrogen. If it detects the presence of dihydrogen at a concentration which is greater than a predetermined concentration, the controller 200 transmits a warning signal to a signaling system of the apparatus, for example so as to signal a warning in the cockpit of the aircraft 100.

In another particular arrangement, the controller 200 is connected to a thermal sensor 400, in order to thermally detect an electric arc 10 between the first electrical conductor 4 and the second electrical conductor 6. In particular, the thermal sensor 400 comprises an optical fiber 302. This optical fiber 302 may then be used both for the thermal sensor 400 and for the optical sensor 300 in the preceding particular arrangement.

In the embodiments in which the first and second electrical conductors are arranged in parallel, the device 1 makes it possible for a concentration of dihydrogen to be located longitudinally by the controller 200. In the embodiments in which the first and second electrical conductors are arranged in cells, the device 1 makes it possible for a concentration of dihydrogen to be located two-dimensionally by the controller 200.

Advantageously, the controller 200 is configured to operate in two operating modes:
  a first mode, referred to as monitoring mode, in which the controller 200 monitors for the presence of dihydrogen in the device 1 as long as the presence of dihydrogen is not detected. In the first mode, the controller 200 commands the application of the predetermined voltage difference between the first electrical conductor 4 and the second electrical conductor 6 of a pair 2 of electrical conductors with a first time interval between two successive applications of the predetermined voltage difference; and
  a second operating mode, when the presence of dihydrogen in the device 1 is detected, such that, when the controller 200 detects a concentration of dihydrogen at least in one region of the device 1, the region corresponding to this pair 2 of electrical conductors, the controller 200 commands the application of the predetermined voltage difference between the first electrical conductor 4 and the second electrical conductor 6 of the pair 2 of electrical conductors with a second time interval between two successive applications of the predetermined voltage difference, the second time interval being shorter than the first time interval. This second operating mode makes it possible to increase the frequency of the electric arcs and, consequently, the volume of dihydrogen burned, when a concentration of dihydrogen is detected. As a result, the efficiency of the device 1 is improved.

In particular, in the embodiment in which the pairs 2 of electrical conductors are supplied with power with a time lag, when the controller 200 detects a concentration of dihydrogen in a particular region of the device 1, the controller 200 applies the second time interval only for the pairs 2 of electrical conductors corresponding to this particular region. Thus, the frequency of the electric arcs is increased only in the particular region in which the concentration of dihydrogen is detected. This makes it possible to increase this frequency further and therefore to improve the efficiency of the device 1 even further.

Combination with a Catalytic Neutralization Member

In one particular arrangement, the aircraft 100 may also comprise an additional device for regulating dihydrogen using a material 500 which catalyzes an oxidization reaction of dihydrogen with the surrounding air, in order to oxidize dihydrogen coming from the tank and/or from the circuit. Combining the device 1 and the additional device makes it possible to regulate the concentration of dihydrogen better.

For example, the catalytic material 500 comprises aluminum and/or cerium oxide and/or a platinoid. In one particularly advantageous arrangement, the platinoid chosen is platinum and/or palladium. According to one embodiment, the platinoid chosen is platinum dioxide, also known by the name "Adams' catalyst".

In one particular arrangement, the additional device comprises a plurality of wires or of spacers which are covered with the catalytic material. It is specified that "wires" is understood to mean wires, strips or cords. The wires may be electrically conductive wires or optical fibers. Advantageously, the additional device comprises a detection unit, in the form of electronic and/or optoelectronic circuitry connected to each wire, in order to detect a reaction of oxidization of dihydrogen by the oxidizing material and transmit (for example, to the pilot) information on the detection of dihydrogen. The detection unit may be connected to, or incorporated or partially incorporated into, the controller 200. If the wires are electrical conductors, then the detection unit comprises impedance sensors (typically coils) positioned on each wire. When dihydrogen encounters the catalytic material at the surface of a wire, the reaction of oxidization of dihydrogen produces heat which is transmitted through the electrically conductive wire, this modifying the impedance thereof. Thus, the impedance sensors make it possible to detect an impedance variation in one or more wires, and therefore to deduce therefrom the presence of dihydrogen in contact with these wires. And if the wires are optical fibers, then the detection unit comprises temperature sensors positioned on each wire. When dihydrogen encounters the catalytic material at the surface of a wire made of optical fiber, the reaction of oxidization of dihydrogen produces heat which is transmitted to the optical fiber, this modifying the temperature thereof. Thus, the temperature sensors make it possible to detect temperature variation in one or more optical fibers, and therefore to deduce therefrom the presence of dihydrogen in contact with these optical fibers.

Attachment

In one particularly advantageous arrangement, the insulating spacers 12 may keep the electrical conductors 4 and 6 connected to one another.

In another arrangement, the electrical conductors 4 and 6 may be connected by a layer or a link made of electrically insulating material. It is specified that, according to this embodiment, the electrical conductors 4 and 6 are kept spaced apart in order to make it possible for dihydrogen to possibly pass through.

According to one embodiment, the electrical conductors 4 and 6, as well as links made of electrically insulating material, may be interleaved in order to form a mesh. It is specified that, according to this embodiment, the electrical conductors 4 and 6 are kept spaced apart in order to make it possible for dihydrogen to possibly pass through.

In another arrangement, the electrical conductors 4 and 6 may be bonded to a surface, such as, for example, an outer surface of a dihydrogen tank or of a dihydrogen circuit duct, while at the same time being kept spaced apart. The surface may also correspond to a surface of a closed or semi-closed space, for example of the aircraft 100, in which dihydrogen should be prevented from accumulating.

In another arrangement, the device 1 is in the form of a sleeve arranged around a region for connecting dihydrogen distribution elements, for example around a connector for dihydrogen distribution pipes.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An apparatus containing at least one of a dihydrogen tank or a dihydrogen circuit, the apparatus comprising a device for regulating a concentration of dihydrogen which comprises:

at least one pair of electrical conductors as well as at least one controller and which is located outside the tank and/or the circuit, each pair of electrical conductors comprising a first electrical conductor and a second electrical conductor, the first electrical conductor and the second electrical conductor of each pair being spaced apart by a predetermined distance, and the at least one controller being configured to repeatedly command an application of a predetermined voltage difference between the first electrical conductor and the second electrical conductor so that, based on said predetermined distance, an electric arc of controlled power is formed between the first electrical conductor and the second electrical conductor, wherein the device comprises several spaced-apart insulating spacers interposed between the first electrical conductor and the second electrical conductor of each pair, the insulating spacers being formed as balls or ovoids.

2. The apparatus according to claim 1, wherein the device comprises a first series composed of the first electrical conductors orientated in a first direction and comprises a second series composed of the second electrical conductors orientated in a second direction which intersects the first direction, so that the first series and the second series form cells.

3. The apparatus according to claim 1, wherein the device comprises a first series of first electrical conductors orientated in a first direction and comprises a second series of second electrical conductors orientated in a second direction which is parallel to the first direction.

4. The apparatus according to claim 1, wherein the device is configured so that the at least one controller commands the application of the predetermined voltage difference between the first electrical conductors and the second electrical conductors simultaneously for various pairs of electrical conductors.

5. The apparatus according to claim 1, wherein the device is configured so that, for each pair of electrical conductors being supplied with electricity independently of other pairs of electrical conductors, the at least one controller commands the application of the predetermined voltage difference between the first electrical conductors and the second electrical conductors with a time lag for at least two pairs of electrical conductors.

6. The apparatus according to claim 5, wherein the at least one controller is configured to command the application of the predetermined voltage difference between the first electrical conductors and the second electrical conductors so that at most a single pair of electrical conductors is supplied with power at each instant.

7. The apparatus according to claim 1, wherein the at least one controller is connected to at least one optical sensor and the at least one controller is configured to receive a signal originating from the at least one optical sensor, to analyze this signal so as to detect a possible presence of a spectral line corresponding to a combustion of dihydrogen and to transmit a warning signal to a signaling system of the apparatus upon a detection of such a spectral line.

8. The apparatus according to claim 7, wherein the at least one optical sensor is connected to at least one optical fiber.

9. The apparatus according to claim 8, wherein the at least one optical fiber is parallel to the first electrical conductor or to the second electrical conductor.

10. The apparatus according to claim 1, wherein the at least one controller is connected to at least one thermal sensor and the at least one controller is configured to receive a signal originating from the at least one thermal sensor, to analyze this signal so as to detect a possible temperature rise due to a combustion of dihydrogen and to transmit a warning signal to a signaling system of the apparatus upon detection of such a temperature rise.

11. The apparatus according to claim 10,
wherein the at least one controller is connected to at least one optical sensor and the at least one controller is configured to receive a signal originating from the at least one optical sensor, to analyze this signal so as to detect a possible presence of a spectral line corresponding to a combustion of dihydrogen and to transmit a warning signal to a signaling system of the apparatus upon a detection of such a spectral line, wherein the at least one optical sensor is connected to at least one optical fiber, and wherein the at least one optical fiber is used both for the at least one optical sensor and for the at least one thermal sensor.

12. The apparatus according to claim 1, further comprising a catalytic material which catalyzes an oxidization reaction of dihydrogen with surrounding air.

13. The apparatus according to claim 12, wherein the catalytic material is applied to at least one of an electrical conductor, an optical fiber, or the insulating spacers.

14. The apparatus according to claim 1, wherein the at least one controller is configured to operate in two operating modes:

a first monitoring mode, in which the at least one controller monitors for the presence of dihydrogen in the device as long as the presence of dihydrogen is not detected, and in which the at least one controller commands the application of the predetermined voltage difference between the first electrical conductor and the second electrical conductor of a pair of conductors with a first time interval between two successive applications of the predetermined voltage difference; and a second operating mode, when the presence of dihydrogen in the device is detected, such that, when the at least one controller detects a concentration of dihydrogen at least in one region of the device, said region corresponding to this pair of conductors, the controller commands the application of the predetermined voltage difference between the first electrical conductor and the second electrical conductor of the pair of electrical conductors with a second time interval between two successive applications of the predetermined voltage difference, the second time interval being shorter than the first time interval.

15. An apparatus containing at least one of a dihydrogen tank or a dihydrogen circuit, the apparatus comprising a device for regulating a concentration of dihydrogen which comprises:

at least one pair of electrical conductors as well as at least one controller and which is located outside the tank and/or the circuit, each pair of electrical conductors comprising a first electrical conductor and a second electrical conductor, the first electrical conductor and the second electrical conductor of each pair being spaced apart by a predetermined distance, and the at least one controller being configured to repeatedly command an application of a predetermined voltage difference between the first electrical conductor and the second electrical conductor so that, based on said predetermined distance, an electric arc of controlled power is formed between the first electrical conductor and the second electrical conductor, wherein the at least one controller is connected to at least one optical sensor and the at least one controller is configured to receive a signal originating from the at least one optical sensor, to analyze this signal so as to detect a possible presence of a spectral line corresponding to a combustion of dihydrogen and to transmit a warning signal to a signaling system of the apparatus upon a detection of such a spectral line.

16. An apparatus containing at least one of a dihydrogen tank or a dihydrogen circuit, the apparatus comprising:
  a device for regulating a concentration of dihydrogen which comprises:
    at least one pair of electrical conductors as well as at least one controller and which is located outside the tank and/or the circuit,
    each pair of electrical conductors comprising a first electrical conductor and a second electrical conductor, the first electrical conductor and the second electrical conductor of each pair being spaced apart by a predetermined distance, and
    the at least one controller being configured to repeatedly command an application of a predetermined voltage difference between the first electrical conductor and the second electrical conductor so that, based on said predetermined distance, an electric arc of controlled power is formed between the first electrical conductor and the second electrical conductor; and,
  an additional device for regulating dihydrogen using a material which catalyzes an oxidization reaction of dihydrogen with surrounding air.

* * * * *